US012321250B1

(12) United States Patent
Dalgaard et al.

(10) Patent No.: US 12,321,250 B1
(45) Date of Patent: Jun. 3, 2025

(54) CONFIGURABLE TELEMETRY DATA PROCESSING VIA OBSERVABILITY PIPELINES

(71) Applicant: Amazon Technologies, Inc., Seattle, WA (US)

(72) Inventors: Jaana Dalgaard, San Francisco, CA (US); Sergey Generalov, Cupertino, CA (US); Kumar Deepak Syam Kallakuri, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 575 days.

(21) Appl. No.: 17/710,371

(22) Filed: Mar. 31, 2022

(51) Int. Cl.
*G06F 9/455* (2018.01)
*G06F 11/30* (2006.01)

(52) U.S. Cl.
CPC ...... *G06F 11/3006* (2013.01); *G06F 9/45558* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS 11,197,075 B1 * 12/2021 Kamen ............... H04L 43/0817

* cited by examiner

*Primary Examiner* — Charlie Sun
(74) *Attorney, Agent, or Firm* — Nicholson Devos Webster & Elliott LLP

(57) ABSTRACT

Techniques for configurable telemetry data processing via observability pipelines are described. A user may configure an observability pipeline for particular sources of telemetry data such as a containerized application in a provider network. The observability pipeline configuration can identify telemetry data sources, types of telemetry data to be processed, as well as zero, one, or more processing functions to act upon the telemetry data before being sent to one or more destination systems specified in the configuration. Telemetry data collection agents can be automatically configured for use and subsequently halted when no longer needed.

20 Claims, 9 Drawing Sheets

▼ REGION-US-EAST    & USER: SINGH    COMPANY-X

OBSERVABILITY SERVICE

*OBSERVABILITY PIPELINE MANAGEMENT*

| CREATE NEW OBSERVABILITY PIPELINE | VIEW OBSERVABILITY PIPELINES ⚠ | ADVANCED CONFIGURATION |
|---|---|---|

| PIPELINE NAME | 1HR | 24HR | STATUS | | |
|---|---|---|---|---|---|
| APP1-LOGS-TO-STORAGE | 60 | 1440 | ACTIVE | MORE | EDIT |
| APP1-PERF-METRICS-TO-ANALYTICS | 3,522 | 681,265 | ACTIVE | MORE | EDIT |
| APP1-PERF-METRICS-TO-DEVOPS | 3,522 | 681,265 | ACTIVE | MORE | EDIT |
| APP1-PERF-METRICS-TO-SECURITY | 3,522 | 681,265 | ACTIVE | MORE | EDIT |
| ⚠ APP1-TRACES-TO-STORAGE | 0 | 1,325 | ERROR | MORE | EDIT |
| APP2-PERF-METRICS-TO-DEVOPS | 193 | 603 | ACTIVE | MORE | EDIT |
| APP2-PERF-METRICS-TO-SECURITY | 0 | 0 | DISABLED | MORE | EDIT |

CONFIGURABLE TELEMETRY DATA PROCESSING VIA OBSERVABILITY PIPELINES

BACKGROUND

Application containerization is a popular type of virtualization technology. Broadly speaking, containerization represents a type of operating system virtualization that allow users to run software applications and their dependencies in resource-isolated processes and in a consistent manner across different types of deployment environments. To enable container-based applications to run consistently across different deployment environments, a container is constructed as an atomic, self-contained package of software that includes everything needed to run the software contained therein (including, for example, any necessary code, libraries, packages, and so forth). The use of containers has become a popular application development and deployment tool in part because containers are often more portable, lightweight, standardized, and easier to deploy in a consistent manner compared to other types of application deployment strategies.

BRIEF DESCRIPTION OF DRAWINGS

Various examples in accordance with the present disclosure will be described with reference to the drawings, in which:

FIG. 4 is a diagram illustrating an exemplary GUI for observability pipeline activity monitoring according to some examples.

DETAILED DESCRIPTION

Figure 1:
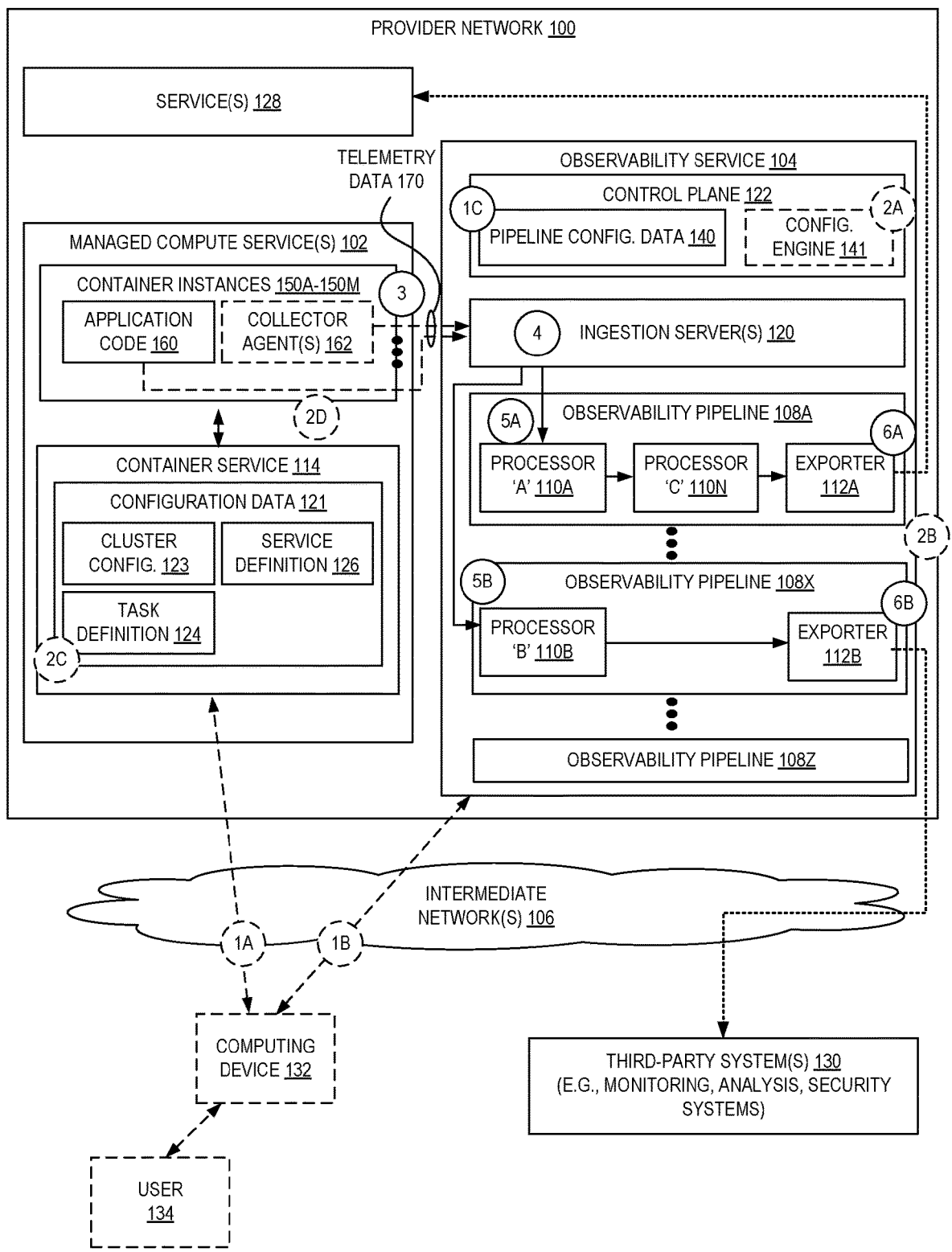
FIG. 1 is a diagram illustrating an environment implementing configurable observability and security pipelines for containerized applications according to some examples.

The present disclosure relates to methods, apparatus, systems, and non-transitory computer-readable storage media for configurable telemetry data processing via observability pipelines. According to some examples, an observability service allows users to flexibly configure and utilize observability pipelines that define how and from where to collect observability event data (also referred to herein as "telemetry data") from their cloud-based resources, how to process this data, and where to forward the processed data to. Via use of the observability pipelines, an observability service can perform this processing and manage the associated computing resources on behalf of its users, eliminating the operational overhead associated with configuring applications for telemetry collection, deploying and managing telemetry collector agents, deploying and managing processing resources, and the like.

In recent times, cloud-native technologies and microservices have allowed organizations to develop complex applications quickly and efficiently. For example, many developers and organizations utilize modern software development practices such as agile development, continuous integration and continuous deployment (CI/CD), etc., together with cloud-native technologies such as microservices, Docker containers, Kubernetes, serverless functions, and the like. However, by developing and deploying new applications and components rapidly, in many different locations, possibly using many different programming languages, for varying periods of time (e.g., fractions of a second such as the case of on-demand serverless functions, minutes or hours or days or more in the case of containers, etc.), and by various teams of developers with different needs and development practices, getting good observability into these systems is incredibly difficult.

Thus, to ensure the ongoing performance of such systems, obtaining observability into these increasingly complex systems has become more important than ever. In cloud computing, the term "observability" generally is used to refer to the software and associated practices for obtaining, aggregating, correlating, and analyzing performance-related telemetry data from applications and the hardware it runs on to allow for effective monitoring, troubleshooting, and debugging. Organizations need to be able to obtain large amount of high-quality telemetry data that can be used to create high-fidelity information detailing every application user request or transaction.

Existing observability platforms collect performance telemetry by integrating with existing instrumentation built into applications and their underlying infrastructural components, and by providing tools to add instrumentation to these components. Thus, application developers may specifically develop their software and/or underlying hardware with observability in mind, such as by utilizing APIs, SDKs, and associated tooling of a telemetry system (e.g., the open-source OpenTelemetry project, or a vendor-specific offering) to create and collect telemetry data and then forward it to a variety of analysis tools. With this telemetry data, a platform may be configured to correlate it in near real-time to provide DevOps teams, site reliability engineering (SREs) teams, IT staff, developers, security teams, and the like, specific contextual information into issues that may arise.

Though observability tooling can provide great benefits, it currently comes with great costs. As one example, many growing organizations are unable to adequately implement an observability system due to the tremendous management costs (e.g., time, knowledge, financial, etc.) of doing so. For example, an example service that runs on a cloud container service may need five or more different collector agents installed, configured, and maintained in order to be able to collect and send the appropriate metrics, logs, traces, security data, etc. As part of this effort, a developmental team may need to develop and maintain a custom configuration for each application to get application specific data. Further, it is difficult to select and implement an observability orchestrator as because the utilized observability tools may be substantially different across the various application components or services used to run the application.

Additionally, many different users may want different types of telemetry data from an application and may want their type of telemetry data processed differently (e.g., at a higher or lower level of granularity) and/or sent to a different destination (e.g., to a storage location, to a cloud-internal service, to a cloud-external service, etc.), and this may change over time. However, the implementation of an observability configuration-which takes huge amounts of time and expertise-typically leads to observability platforms that are very rigid as they are specifically tuned to the exact needs of the implementor and are very inflexible. For example, an organization's security team may be interested in large amounts of data from large numbers of sources, while an application developer may want much more limited types of telemetry data such as metrics related to memory or processing utilization and may have set up an observability platform with only that data being collected and processed.

Moreover, observability is a vital ingredient of today's DevOps platforms. However, DevOps platform operators face significant challenges collecting metrics, logs, and traces across the potentially hundreds of applications that they run. First, observability design is typically static, and making dynamic changes to the granularity of data or new destination sources for troubleshooting or investigation is extremely time and labor consuming. Second, DevOps teams may want to lower observability management overhead by running fewer agents and store only the necessary data for respective teams. In current systems, though, these teams are unable to easily process (e.g., filter, enrich by adding metadata, etc.) metrics and logs without custom code before sending the data to developers and security administrators. Further, users usually pick only one orchestrator to build their observability platform on, rather than enable multiple orchestrators to their developers, because of differences in observability management and that it would require developers to understand the details of all.

Accordingly, examples described herein provide a flexible, easy-to-configure and update system for allowing users to configure observability pipelines that can be easily applied to particular computing resources (e.g., containers, clusters of containers, or even non-containerized environments) to enable simple collection, processing, and routing of telemetry data. Moreover, examples disclosed herein allow users to easily modify aspects of telemetry data collection, processing, and/or exporting to satisfy changing requirements from different involved entities and purposes (e.g., developers, security analysts, fault monitoring, etc.).

For example, DevOps administrators can use the disclosed observability service to easily setup observability pipeline "templates" in the form of pipeline configurations (e.g., including definitions for the collection sources, which clusters/applications to attach to, what processing logic should be used, and/or what destinations to send the data to) for developers and security teams without having to create custom configurations. In some examples, these users can reduce their observability costs by retaining control of how the data is processed to reduce the number of metrics points or filter for error logs and can also create multiple pipeline configuration templates to serve multiple destination types and persona needs across developers, platform teams, and security teams easily. The observability service can also, in some examples, automatically inject necessary collector agents based on the pipeline definition and manage the lifecycle of those agents as well. Thus, the observability service can provide users with a holistic global plane to provide full control over telemetry collection, processing, and exporting.

FIG. 1 is a diagram illustrating an environment implementing configurable observability and security pipelines for containerized applications according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a container service 114 that can orchestrate the deployment and execution of containers, a storage service that can store data objects, etc. The users (or "customers") of provider networks 100 can use one or more user accounts that are associated with a customer account, though these terms can be used somewhat interchangeably depending upon the context of use. Users (e.g., a user 134) can use computing devices (e.g., a computing device 132) interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

A cloud provider network 100 can be formed as a number of regions, where a region is a geographical area in which the cloud provider has data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Purposefully, AZs within a region are positioned far enough away from one another so that a natural disaster (or other failure-inducing event) should not affect or take more than one AZ offline at the same time.

Generally, the traffic and operations of a provider network 100 can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

A provider network 100 can provide one or more "managed" compute services 102 that allow users to execute applications or code while the provider network 100 manages aspects of the underlying infrastructure, including the underlying hardware and in some examples some underlying software.

For example, one managed compute service 102 can include a hardware virtualization service (referred to in various implementations as an elastic compute service, a virtual machines service, a computing cloud service, a compute engine, or a cloud compute service) that enables users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As another example, a managed compute service 102 can include an on-demand code execution service (also referred to as a function compute service, functions service, cloud functions service, functions as a service, or serverless computing service) that can execute serverless functions. A "serverless" function can include code provided by a user or other entity—such as the provider network itself—that can be executed on demand. Serverless functions can be maintained within a provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A cloud service provider can provide a managed compute service 102 in the form of one or more container services broadly providing container management functionality that enable users to run, stop, and manage containers on clusters of computing resources used to execute the containers. These container services can launch users' containers according to defined task or service definitions defining characteristics of a containerized application, where a given container executes on computing infrastructure located within one of a plurality of selected AZs of the cloud provider network.

In some examples, a container service 114 is a container orchestration and management service (referred to in various implementations as a container service, cloud container service, container engine, or container cloud service) that allows users of the cloud provider network 100 to instantiate and manage containers. A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated, a container service 114, such as the Amazon Elastic Container Service (ECS)™, may be a highly scalable, high performance container management service that supports containers (e.g., Docker containers) and allows users to easily run applications on a managed cluster of compute instances, eliminating the need for users to install, operate, and scale their own cluster management infrastructure. With simple API calls, users can launch and stop container-enabled applications, query the complete state of their clusters, and utilize provider network features such as virtual firewalls, load balancing, virtual block storage volumes, and Identity Access Management (IAM) roles. Users may use the container service 114 to schedule container placement across a cluster based on their unique resource needs and availability requirements or may integrate their own schedulers or third-party schedulers to meet business or application specific requirements.

To prepare an application to be run using the container service 114, in some examples, a user 134 defines or provisions a cluster, creates a task or service definition corresponding to the application, and optionally provides associated configuration data that the container service 114 can use to manage execution of the user's application. For example, a task or service definition can include the specification of a placement strategy for tasks or services and their associated containers. A placement strategy broadly is an algorithm for selecting compute instances or other computing resources for task/container placement or for selecting tasks/containers for termination. In some examples, task placement strategies can include bin packing (e.g., such that containers are placed on compute instances to leave the least amount of unused CPU or memory), random placement, or spread placement (e.g., such that containers associated with a task or service are placed evenly across available compute instances, across available AZs, or based on other container instance attributes or combinations thereof).

In some examples, a container service 114 enables users to create "clusters." A cluster is a logical grouping of execution resources that can be used to execute containers associated with one or more associated tasks or services. A user can register one or more compute resources (e.g., compute instances such as VMs, physical computing devices, etc.) with a cluster and, once registered, those compute resources become available to run tasks. A compute instance may be used somewhat synonymously with the term "container instance," though the latter may refer more specifically to an execution resource (e.g., a compute instance or physical host) that is running a container agent, has a container runtime installed, and has been registered with a cluster. In some examples, container instances 150A-150M may be hosted within the provider network 100 such as via use of a hardware virtualization service or other computing resources.

Thus, via a console application (e.g., a web-based application or custom application) or API, a user 134 can use a computing device (e.g., computing device 132) to send commands to the container service 114 (including, e.g., a "create-cluster" command) to create or configure a cluster and to associate container instances with the cluster, where those container instances are located in one or more AZs. Metadata provided by the user in the command(s) or generated by the container service 114 may be stored as cluster configuration 123 data including, e.g., a cluster name, identifiers of networking information associated with the cluster such as a subnet or private network that they operate within, tags associated with the cluster, operational configurations such as associated services—e.g., monitoring, auto-scaling—to be enabled for the cluster, etc.

In some examples, a user can install a container agent upon a compute instance or computing device (to qualify it as a "container instance" available for assignment into a cluster), or a compute instance or computing device can be pre-allocated with a container agent by the container service 114 (e.g., by launching a virtual machine compute instance using a machine image having the agent thereupon). Alternatively, or additionally, a new compute instance may be deployed or configured as a container instance when it is added to a cluster, such as via the user submitting a command to both obtain a compute instance (e.g., from a hardware virtualization service) and to add it to the cluster.

A cluster of container instances 150A-150M can thus be used to execute some portion of application code 160, also referred to herein as a "task." Thus, the term "task" is generally used in a broad manner to refer to a set of computing operations of some type associated with an application. In some examples, a "task" can be application code 160 such as a portion of a software application (or the entirety of the application) that can be executed using one or more containers. A user 134 can issue one or more commands (e.g., a "register-task-definition" command) to create a task definition 124 representing a portion of an application the user wishes to run, which can be stored as part of configuration data 121 as task definition 124.

For example, a user 134 can specify parameters to be part of a task definition 124 such as an identifier of a container image to use with each container in the task, amounts and types of computing resources (e.g., CPU, memory, etc.) to use with each task or each container within a task, a launch type to use that identifies the infrastructure on which the tasks are hosted (e.g., a hardware virtualization service, an on-demand serverless execution service, an "external" launch type indicating that the task is to be run on an external container instance that is remote from the service provider network), a logging configuration to use for the tasks, an indicator of whether the task should continue to run if the container finishes or fails, a command that the container should run when it is started, identifiers of any data volumes that should be used with the containers in the task, an IAM role that the tasks should use, etc. A user can optionally define (or include) one or multiple containers in a single task definition. However, a user's entire application stack does not need to be on within a single task definition, and instead the application can span multiple task definitions where the user combines related containers into their own task definitions, each representing a single component of the application.

A task definition can include text data (e.g., in JavaScript Object Notation (JSON) format) that describes one or more containers forming an application. The task definition can be thought of as a blueprint for the application as it specifies various parameters for the application, which can indicate which containers should be used, which ports should be opened for the application, what data volumes should be used with the containers in the task, etc. The specific parameters available for a task definition depend on the needs of the specific application. A "task instance" (or just "task") may thus represent the instantiation of a task definition within a cluster. After a user has created a task definition for an application, the user can specify the number of tasks to run on the cluster.

Similarly, users can provide configuration data to define services as part of a service definition 126, where a service is an abstraction related to long running applications that allows the user to run and maintain a specified number of instances of a task definition simultaneously. Thus, if any of the tasks of a cluster should fail or stop for any reason, the container service 114 can launch another instance of the task definition to replace it to maintain a desired number of tasks in the service. In some examples, a service can also run behind a load balancer that distributes request traffic across the tasks that are associated with a service.

With this configuration data 121, a container task scheduler (of the control plane of the container service 114) is responsible for placing tasks within a cluster. There are several different scheduling options that may be used, for example, a user can define a service that runs and maintains a specified number of tasks simultaneously. As indicated above, a task scheduler can also place container instances at particular locations within a cluster according to a defined placement strategy.

Application code 160, in some examples, may be executed via container instances 150A-150M managed by a container service 114, and telemetry data 170 is collected that can pertain to the application code 160 itself, the requests sent to and/or responses sent by the application code, the container instances 150, underlying software resources (e.g., a host operating system or virtual machine), underlying hardware resources (e.g., physical memory utilization, processing utilization, memory utilization, network utilization, storage utilization), and the like. This collection—and processing and subsequent distribution—of the telemetry data 170 may be easily configured, modified, and activated by a user 134 (or a set of users).

In some examples, at circle (1A) in FIG. 1, a computing device 132 of a user 134 may transmit a request message to the container service 114 indicating a request to create a cluster configuration and a task or service definition. As indicated previously, a task or service definition can include, e.g., the identification of one or more container images, a type of container execution environment, a type of operating system and CPU architecture for the task, a task size (e.g., specified by CPU and memory values to reserve for the task), a container size (e.g., specified as an amount of memory to present to the container and the number of CPU units to reserve for the container), optional task roles, network modes, storage settings, log collection settings, etc. Responsive to receiving the request, in some examples, the container service 114 generates or updates configuration data 121 corresponding to the task or service definition and stores the task definition 124 and/or service definition 126 data in association with a user account responsible for the request.

In some examples, the task definition or service definition data, as specified or selected or configured by the user 134 (such as via use of a console type application presented by the computing device 132) may include data indicating that one or multiple types of collector agents 162 are to be deployed with the application code 160. For example, a GUI may allow the user to indicate that telemetry data is to be collected (e.g., via an "enable metrics collection" option) for a task so that telemetry data associated with a task is to be collected by a collector agent 162 and then sent (e.g., to an endpoint associated with one or more ingestion servers 120 of an observability service 104, or to another service 128—such as a stream service, or storage service—for subsequent distribution to the ingestion servers 120, etc.). In response, the container service 114 may update the underlying task definition 124 to include configuration data (e.g., a container name for a collector container, a container image location for the collector container, a set of configuration data specifying types of telemetry data to collect, etc.) that causes the container service 114, when launching an instance of a task based on the task definition 124, to also launch a collector agent 162 (e.g., a container sidecar that is preconfigured to send the application code metrics to the ingestion server(s) 120). Alternatively, in some examples, the user 134 may directly specify such collector agent 162 configuration data within a task definition 124 or service definition 126, or a program used by the user 134 via computing device 132 may similarly provide such collector agent 162 configuration data. In other examples, collector agents 162 can be configured and executed in other ways, such as having collector agents 162 directly be a part of the application code 160, be a part of the container instances 150, be a part of underlying compute instances, be executed on an offload card of the underlying computing device, etc.

In some examples, the container service 114 can launch one or multiple containers (or task instances) based on the configured task definition 124 or service definition 126 and cluster configuration 123 over time. As indicated, a task instance involves execution of a container-based software application on computing infrastructure within one of a plurality of AZs of the cloud provider network 100 configured for an associated cluster. For example, a container instance 150 represents a container (executing application code 160) that was launched by the container service 114 on a compute instance 114A running on infrastructure located in an availability zone (of a region) of the provider network 100. Containers can be launched over time responsive to individual launch requests, based on a task scheduler launching and terminating tasks based on various conditions, based on automated scaling operations used to ensure that enough containers are executing to satisfy demand, or combinations thereof.

A collector agent 162, in some examples, collects and distributes one type of telemetry data 170, though in other examples a collector agent 162 can collect and distribute multiple types of telemetry data 170. For example, in some cases multiple collector agents 162 may obtain and distribute telemetry data 170 related to multiple different aspects of the application's execution—e.g., a sidecar container collector agent 162 may report on the performance of the application code 160 itself, while a separate collector agent 162 may collect and distribute log data, while a separate collector agent 162 may collect and distribute network trace data, or the like. However, in other examples a single collector agent can report back multiple types of telemetry data 170, e.g., log data and metrics data.

The collector agents 162 may be implemented using different collection techniques, ranging from issuing calls to operating systems (e.g., for resource utilization level metrics), making file system calls or application calls to obtain logs, to interacting directly with the application code 160. As one example, a collector agent 162 may include a "container agent" that is a software module that runs on each compute instance within a cluster that can obtain and report information about the instance's current running tasks, resource utilization amounts (e.g., CPU, memory, networking), etc., and in some cases, can start and stop tasks whenever it receives a request to do so from the control plane (e.g., of the container service 114). Thus, it may perform local actions under the control of the control plane (e.g., responsive to commands sent by the control plane or configurations initiated from the control plane) and can report back metadata to the control plane, a separate monitoring or logging service of the provider network 100, and/or the ingestion server(s) 120 of the observability service 104.

However, other forms of collector agents 162 can be used in various examples. As one example, a collector agent 162 may be a vendor-agnostic proxy (e.g., the known OpenTelemetry Collector) or modified version thereof that can receive, process, and export telemetry data. The collector agent 162 may support receiving telemetry data in multiple formats (e.g., OTLP, Jaeger, Prometheus, or via other commercial/proprietary tools) and sending data to the ingestion server(s) 120. The collector agent 162 can also support some processing and/or filtering of telemetry data before it gets exported to the ingestion server(s) 120, which can reduce network utilization. In some examples, the collector agent 162 can provide automatic instrumentation as it may support a broad number of components that generate relevant telemetry data from popular libraries and frameworks for supported languages. For example, inbound and outbound HTTP requests from an HTTP library may generate data about those requests, and the collector agent 162 can be loaded alongside the application code 160 to obtain this data, and in other examples a package is explicitly incorporated into the application code 160 codebase that can communicate with the collector agent 162 using a defined interface/protocol.

Thus, in some examples, the collector agent 162 may run with the application code 160 or on the same host as the application (e.g., as a binary, sidecar, or daemonset), and may be capable of receiving telemetry data (e.g., via push and/or pull based techniques) and optionally enhance telemetry data with metadata such as custom tags or infrastructure information. In some examples, the collector agent 162 can offload responsibilities that client instrumentation would otherwise need to handle including batching, retry, encryption, compression, etc. In some examples, the collector agent 162 can also collect metadata from the underlying provider network resources (e.g., containers, compute instances, etc.) and managed services 102, so users can correlate application code 160 performance data with underlying infrastructural data (from the perspective of the provider network 100), allow users to more quickly identify and resolve problems that may occur through use of multiple views and/or granularity of telemetry data. Accordingly, the developer may need to only instrument their application code 160 just once (to interact with a collector agent 162) to be able to thereafter send correlated metrics and traces to and/or use auto-instrumentation agents to collect traces without needing to further change their code.

As described herein, the collector agents 162 can collect various types of telemetry data 170, such as metrics, logs, traces, and the like.

A metric is a measurement about a service or resource, captured at runtime. Logically, the moment of capturing a measurement is known as a metric event which includes not only the measurement itself but the time that it was captured and associated metadata. Application and request metrics can be important indicators of availability and performance. Custom metrics can provide insights into how availability indicators impact user experience or the business. Collected data can be used to alert of an outage or trigger scheduling decisions to scale up a deployment automatically upon high demand. Various types of metrics can include counters, measures, observers, and the like. A counter can be a value that is summed (or added up), and a measure can be a value that is aggregated over time, which represents a value over some defined range. An observer can capture a current set of values at a particular point in time, such as a current memory utilization or number of current requests being processed. Metrics are thus, in some cases, intended to provide statistical information in aggregate, and could include values such as the total number of bytes read by an application, per protocol type; the total number of bytes read and the bytes per request; the duration of a system call; request sizes; CPU or memory usage of a process; average balance values from an account; numbers of current active requests being handled; or the like.

A log is often a timestamped text record, either structured or unstructured, with associated metadata. While logs are an independent data source, they may also be attached to spans as described later herein. Logs are often used to determine the root cause of an issue and typically contain information about who changed what as well as the result of the change.

Traces can track the progression of a single request sent to an application, called a trace, as it is handled by potentially multiple components that make up the application. A request may be initiated by a user or an application. Distributed tracing is a form of tracing that traverses process, network and security boundaries. Each unit of work in a trace is called a span; a trace is a tree of spans. Spans are objects that represent the work being done by individual services or components involved in a request as it flows through a system. A trace may contain a single root span which encapsulates the end-to-end latency for the entire request, which can be thought of as a single logical operation, such as clicking a button in a web application to add a product to a shopping cart. The root span would measure the time it took from an end-user clicking that button to the operation being completed or failing (so, the item is added to the cart or some error occurs) and the result being displayed to the user. A trace may be made up of the single root span and any number of child spans, which represent operations taking place as part of the request. Each span contains metadata about the operation, such as its name, start and end timestamps, attributes, events, and status.

Other types of telemetry data 170 can also be collected, such as in the format of name/value pairs, which can be used to index observability events in one service with attributes provided by a prior service in the same transaction, allowing the establishment of causal relationships between events.

Notably, though the deployment of application code 160 and/or collector agents 162 is primarily described herein as occurring within the provider network 100, it is to be appreciated that in various embodiments some or all of the source(s) of telemetry data 170 may be implemented in other manners and/or in other locations, e.g., outside of the provider network 100 such as in a third-party network, public data center, private data center, on-premise environment, or the like.

As shown in circle (1B), the computing device 132 of the user 134 may interact with the observability service 104 to configure one or multiple observability pipelines 108A-108Z by creating pipeline configuration data 140 at circle (1C), where the pipeline configuration data 140 can include one or more entries, each corresponding to an observability pipeline 108.

As indicated and illustrated elsewhere herein, a user 134 may provide data to configure an observability pipeline 108 by specifying one or more sources of telemetry data (e.g., an identifier of a cluster, an identifier of a specific container instance 150, a tag that can be applied to various resources, a wildcard or value or format to match against a source identifier, etc.), one or more types of telemetry data to be collected from the one or more sources (e.g., logs, metrics, traces, etc.), zero or more processing steps or phases to be applied to the collected data (e.g., filtering, enrichment, transformations, and the like), and one or more destinations where the collected (and optionally processed) telemetry data is to be sent to (e.g., a provider network 100 internal service 128 such as an analytics service, security analysis service, metric repository service, object storage service, or the like) or a third-party system 130 (e.g., an application monitoring service such as a "cloud monitoring as a service" system, an analysis service, an observability and/or security platform, etc.).

After one or more pipelines have been so configured, in some examples a configuration engine 141 at circle (2A) may perform various initialization operations, though this may not be strictly necessary in some examples.

In one example case, the configuration engine 141 may, as shown with reference to circle (2B), configure the observability service 104 to be able to support the configured pipeline(s). For example, the configuration engine 141 can launch or configure new ingestion server(s) 120 to ensure proper operational support for the new processing. As another example, the configuration engine 141 can provide some of the pipeline configuration data 140 to the ingestion servers 120 for use in identifying, for particular telemetry data 170, which observability pipelines are to be used (e.g., in the form of data structure "mapping information" associating a source (e.g., a unique cluster or container ID, a tag, a network address associated with a source, etc.) with one or more pipelines (e.g., in the form of a network address or hostname of one or more processors 110 and/or an exporter 112)), though in some cases this data transfer between the control plane 122 and the ingestion server(s) 120 can occur at different times, such as in a synchronous on-demand basis, according to a schedule, or the like. As another example, the configuration engine 141 can deploy computing resources for the pipeline, such as by obtaining code for pipeline-specified processors 110 or deploying and/or configuring (system-provided or user-provided) processors 110 and/or exporters 112 (e.g., configured with credentials provided with the pipeline configuration data 140 for sending data to another system). The processors 110 and exporters 112 can be implemented on a same physical host device, or partially or completely distributed across multiple physical host devices, based on the desires of the implementor and the particular use case.

In some examples, the configuration engine 141 may interact with ones of the managed compute services 102 to ensure that the desired sources of telemetry data 170 are properly configured to provide such data. For example, for a source (e.g., a cluster of containers) identified in the pipeline configuration data 140, the configuration engine 141 can determine whether the proper collector agents 162 are operational (e.g., by interacting with a control plane of the compute service 102, by communicating with a collector agent 162, etc.). As another example, in the case of a source being identified as any task launched based on a particular task definition 124, the configuration engine 141 can determine at circle (2C) whether the task definition 124 includes the proper configuration necessary to launch the needed collector agents 162, and if not, may automatically insert such a configuration into the task definition 124, enabling the collector agents 162 to be automatically created and terminated along with the task's creation and termination at circle (2D).

Thereafter, as the application runs (e.g., across one or multiple container instances 150A-150M), telemetry data 170 is collected by the collector agents 162 external to the application code 160 (or, integrated with the application code 160) and sent to the ingestion server(s) 120. At circle (4), this telemetry data 170 is received and the ingestion server(s) 120 can analyze it to determine which one or more of all registered observability pipelines 108A-108Z are to be used to process the data. For example, the ingestion server(s) 120 may identify a source of the telemetry data 170 (e.g., identify a source network address, a hostname, a provider-network-unique identifier associated with the source, etc.) and use this value to identify one or more observability pipelines. This may occur using partial pipeline configuration data 140 in the form of a mapping data structure provided during optional circles (2A)-(2B), which may be cached by the ingestion server, or in a synchronous manner and obtained from the control plane 122 by an ingestion server 120 as needed, and optionally cached local to the ingestion server 120.

As one example, the ingestion server 120 performs a lookup into the mapping structure using the identified source identifier to identify one or more endpoints of one or more processors 110 of one or more corresponding observability pipelines, as well as one or more exporters 112 of these pipelines. In this case, the ingestion server 120 may orchestrate the movement of the telemetry data 170 throughout the associated pipelines, e.g., by sending a request to a first identified processor (e.g., processor 'A' 110A) of a pipeline (e.g., pipeline 108A), obtaining a result of the processing, sending a request a second identified processor (e.g., processor 'B' 110B) of that pipeline, obtaining a result of the processing, and so on, followed by sending the processed data to the identified exporter (e.g., exporter 112A).

However, the observability pipelines can be configured differently in other examples. As one example, in some implementations at circle (4) the ingestion server 120 may only need to identify a single endpoint (e.g., associated with a first processor, or an exporter when there are no processors) for each associated observability pipeline, and simply send the telemetry data 170 to that endpoint, and the observability pipeline itself may be configured to automatically move the data through the pipeline. For example, for a first observability pipeline 108A, the ingestion server 120 may send the telemetry data 170 at circle (5A) to the processor 'A' 110A, and the processor 'A' 110A may have been already configured to send the data, after it is done processing, to processor 'C' 110N, which in turn is configured to send its resultant data to exporter 112A, which at circle (6A) is configured to transmit the data to a particular destination (here, an internal service 128). This configuration has the benefit of the ingestion server 120 only needing to track limited mapping information (e.g., an identifier associated with an entry point of each pipeline along with the corresponding source identifier(s)), and further, allows the ingestion server 120 to not have to continue orchestrating the movement of the data through the pipeline(s), freeing it up to obtain and route incoming telemetry data 170 more efficiently.

Other variations also exist. For example, the ingestion server 120 may be able to obtain, for an item of telemetry data 170, identifiers associated with each entity (processor or exporter) in each associated observability pipeline. The ingestion server 120 may then be able to add or encode this information (or similar) to its request sent to the first endpoint (e.g., processor 'A' 110A) so that each entity in the pipeline knows how to forward on its resultant data based on the content of this message. This configuration has the benefit of allowing processors and/or exporters to be more generic and not tied down to particular pipeline routes, but can more flexibly route the data.

As described herein, each processor 110 performs a particular operation or transformation on the data it is provided, and may include operations such as filtering (e.g., removing particular columns of data, and/or rows of data, and/or values), enriching the data (e.g., adding or changing the data based on some algorithm or other knowledge, such as hashing or encrypting data values, encoding the data values), batching the data, generating inferences based on the data (e.g., feeding values of the data as inputs to a machine learning model), or the like. In some examples, these processors may be "generic" and provided by the observability service 104, often through use of other services of the provider network such as a hardware virtualization service, "serverless" code execution service, machine learning or analytics service, or the like. However, in some examples, ones of these processors can be user-provided, such as a code snippet (e.g., a serverless function) or application (e.g., a program, or executing compute instance) provided by the user and executed as part of the pipeline, and this code may also be executed via other such services.

As illustrated herein, the telemetry data 170 is mapped, by the ingestion server(s) 120, to two different observability pipelines 108A/108X at circles (5A) and (5B), and eventually distributed at circles (6A) and (6B) to an internal service 128 and a third-party system 130. Notably, these pipelines may include different processors 110 and/or exporters 112, which can allow the same telemetry data 170 to be processed according to different needs and/or sent to different locations based on different needs. It is to be appreciated that, for a particular application, multiple different collector agents 162 may be sending this type of telemetry data 170, and/or different types of telemetry data 170 (e.g., metrics as well as logs), and each type of data can be uniformly processed by one or more observability pipelines and sent to one or more different destinations, allowing for different uses of the telemetry data.

Further, these pipelines can be added, removed, and/or modified over time to change the observability processing without requiring additional modifications on the part of the application code 160 developer. In some examples, the pipelines can also be added, removed, and/or modified based on particular events occurring, or on a scheduled basis, to allow different types or granularities or amounts of the telemetry data 170 being processed to be changed according to changing conditions. For example, in the event of a production system failure occurring (where it is traditionally not standard practice to collect large amounts of observability information), new amounts and/or types of telemetry data 170 can be rapidly enabled by manually creating a new observability pipeline (e.g., by a security team member) or by configuring the observability service with an event-based pipeline enablement condition to turn on a previously configured (but not actively used) pipeline when a particular operational metric threshold is reached, when an error is detected, when a new software vulnerability is published, when a threshold number of system or application failures are detected, etc. Accordingly, a response team can very quickly see the precise types of telemetry data that they require to troubleshoot the problem.

Figure 2:
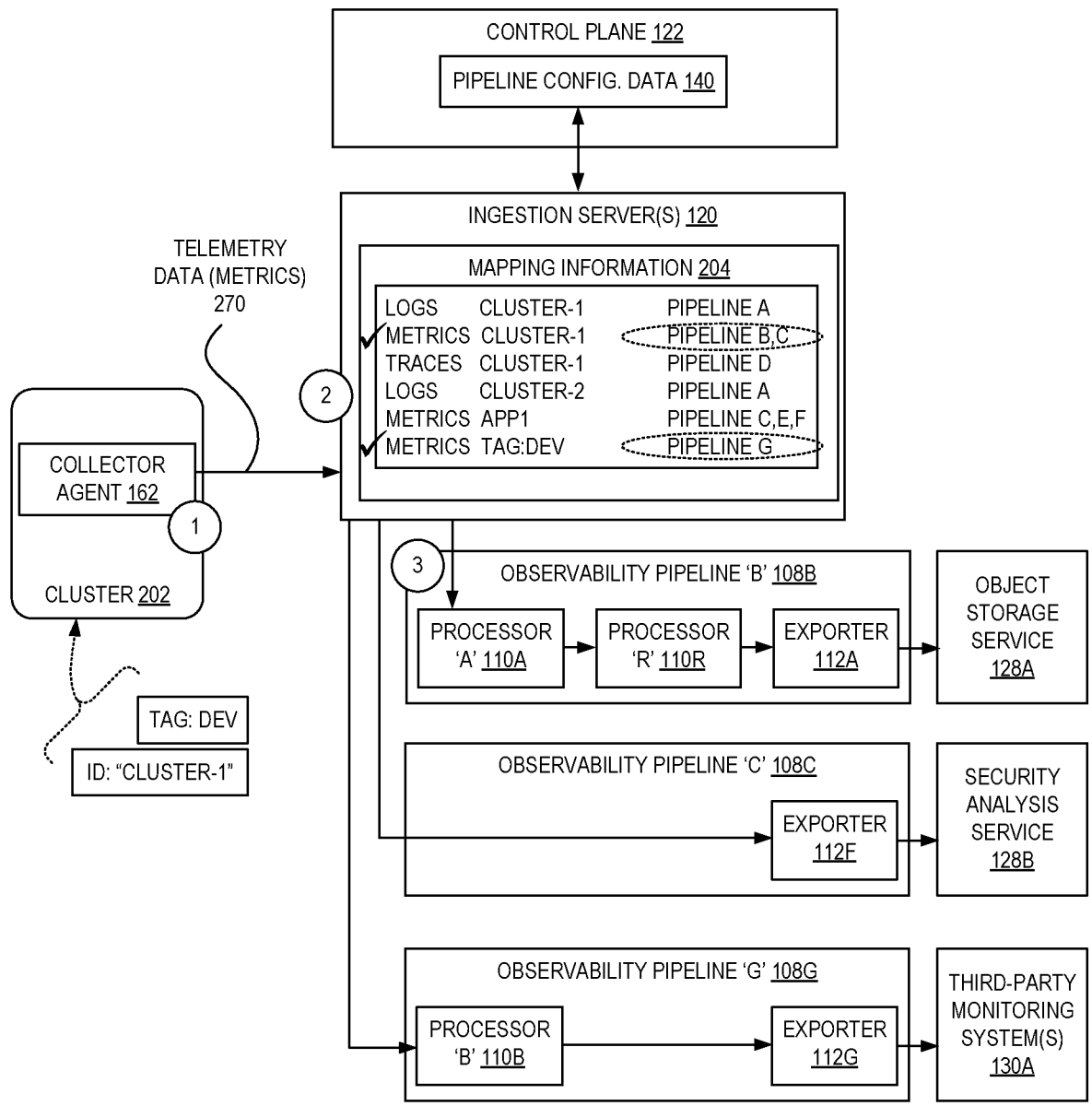
FIG. 2 is a diagram illustrating exemplary routing of telemetry data via multiple observability pipelines according to some examples.

For example, FIG. 2 is a diagram illustrating exemplary routing of telemetry data via multiple observability pipelines according to some examples. In this example, the collector agent 162 is operating as part of a cluster 202 of container instances (identified as "CLUSTER-1", and being user-associated with a tag of "DEV") and sends telemetry data 270 in the form of metrics at circle (1).

At circle (2), the ingestion server 120 that receives the telemetry data 270 can determine that the data was originated by the particular collector agent 162 (e.g., based on a source network address, a unique identifier carried along with the telemetry data 270, etc.) and determine that the collector agent 162 operates as part of a cluster referred to as "CLUSTER-1" that is tagged with a "DEV" tag. This determination can be made based solely or partially on the messages carrying the telemetry data 270; for example, these messages may carry this information, or may carry a unique identifier associated with the collector agent that allows the ingestion server 120 to look it up (e.g., by querying another control plane system of the provider network).

Thereafter, the ingestion server 120 can use this information to perform a lookup via the mapping information 204 data structure to identify which one or multiple observability pipelines are enabled for this telemetry data 270. In this example, the mapping information 204 data structure includes several entries, each mapping a combination of telemetry data type (e.g., LOGS, METRICS, TRACES, etc.) and a source identifier (e.g., CLUSTER-1, APP1, a tag of "DEV", etc.) with a corresponding set of one or more pipeline identifiers, here shown with letter values for ease of understanding, though in practice different forms of this data can be used such as a unique pipeline identifier or name, a network address associated with the pipeline, or the like. In this example, two different entries of the mapping information 204 data structure are matched by the lookup—a first entry for metrics originated from within cluster-1 (to be processed via pipelines B and C) and a second entry for metrics originated from any resource tagged with "DEV" (to be processed via pipeline G).

Upon performing this lookup, the ingestion server 120 identifies that the telemetry data 270 is to be processed via observability pipeline B 108B, observability pipeline C 108C, and observability pipeline G 108G, which are selected from multiple other possible pipelines implemented in the system. Thus, at circle (3), the ingestion server 120 can cause the telemetry data 270 to be processed by these three pipelines, for example by sending the telemetry data 270 to processor A 110A, exporter 112F, and processor B 110B. As a result, the telemetry data 270 is processed in different ways by the different observability pipelines and sent to different destination systems-here, an object storage service 128A, a security analysis service 128B, and a third-party monitoring system 130A.

As described herein, beneficially this observability system in some examples allows users to define customized observability pipelines specific to the needs of various users, often without requiring changes to the application code itself, such as when the application was initially instrumented to support telemetry data collection. This configuration can occur via various GUIs, such as those presented by a console type application that allows users to manage and utilize services of a provider network.

Figure 3:
FIG. 3 is a diagram illustrating an exemplary graphical user interface (GUI) for user-specified observability pipeline configuration according to some examples.

For example, FIG. 3 is a diagram illustrating an exemplary GUI 300 for user-specified observability pipeline configuration according to some examples. This GUI 300, and subsequently illustrated GUIs in the following figures, are shown as part of a web-based console application, though of course other interfaces may be provided in other examples, and thus these are to be understood as being just one exemplary configuration. Further, various examples can also user configuration without even needing a graphical interface, as a user can use other tools or interfaces known to those of skill in the art to configure observability pipelines.

In FIG. 3, the GUI 300 presents a view with a user interface (UI) section 302 (or panel, pane, portion, box, or the like) allowing a user to create a new observability pipeline. In this example, a user may use a UI element 304 to provide a name for the pipeline, here shown as "APP1-PERF-METRICS-TO-ANALYTICS", perhaps indicating it is a pipeline for a first application ("APP1") that collects performance metrics for the purpose of analytics. A next set of UI elements 306 allows the user to indicate what source or sources the telemetry data is be obtained from. In this example, the user may use a drop-down selection box select a known "resource" within the provider network (e.g., associated with the user's account, the user's organization, or the like). This list of resources may include, for example, resources such as clusters (e.g., of containers, virtual machines), individual containers or virtual machines, serverless functions, or other applications or programs executed within the provider network. In this example, a user has selected a particular resource (e.g., via a radio button next to the term "RESOURCE") is to be used as the source, which has a name (or other identifier) of "PRODUCTION-CONTAINER-CLUSTER-1", which may identify a cluster of containers used as a production environment that handles actual "production" traffic. In this example, the user could also select that they wanted to identify sources by use of one or more tags. As is known in the art, in some systems a "tag" (typically an alphanumeric string value such as "red" or "production" or "system1" or the like, or a set of text strings) may be assigned by users to various resources, such as for the purposes of accounting, tracking, visibility, or the like. Thus, a user may specify a tag (or a set of tags, or a portion of a tag to be matched) that, if the originator of telemetry data has that tag (or has a tag within a defined set, or that has a tag matching a tag pattern provided by the user) then that originator is considered a matching source for the purpose of the observability pipeline and its telemetry data will be processed by that pipeline. However, in other examples, other types of source identification techniques may be used, such as by providing an indication of a type of resource (e.g., all containers), some other expression that can be evaluated to determine source group membership, etc. Thus, in some examples a "data source" configured for an observability pipeline may be thought of as being open-ended as the membership can change over time as new resources are created and/or destroyed that match the conditions provided by the user.

This GUI 300 also includes a UI section 308 allowing a user to select which type of telemetry data is to be processed with the pipeline-here, a set of radio buttons allows the user to select only one type (here, from the set of traces, metrics, and logs), though in other examples multiple types can be selected, and the possible options could include more types, fewer types, or "all" types. In this example, "metrics" is selected, and thus if telemetry data arrives from a source indicated by the user's data source configuration (via UI section 306) and that includes metrics, then this data will be processed by the pipeline, and if not, it will not be processed by this pipeline. A "configure" button is also provided that will cause additional configuration options to be presented, such as selecting particular types of metrics, or the like.

To define the pipeline itself, the user may use a UI section 310 to identify zero, one, two, or more processing functions to be applied to the telemetry data (and, in what order those functions are to be applied). As is known in the field of observability, various types of functions can be applied to various types of telemetry data to make the data more useful for its intended purpose. Functions can be fairly standard (and provided by the observability service) or provided by the user (e.g., in the form of a code segment, executable application or script or program, or even simply a network address associated with a resource that will perform the function).

In this example, a first "filter" function is selected that enables "filtering" the data to eliminate certain data (e.g., removing unnecessary rows and/or columns and/or particular values therein matching some defined condition, which can be configured via the configure button).

Second, after the filtering, the resultant data is to be sent to an "enrich" function to be modified or improved in some manner. For example, data can be enriched by parsing the data for "features"-keywords or pieces of information—to be used to automatically populate other fields. Some enrichment functions can also combine values in fields to equate to a value in another field, which can be useful for downstream machine processing or integration with other applications, for example allowing correlation of external feeds along with internal operations and telemetry data. Many other types of enrichment can be used in various examples, such as through the use of other libraries, programs, machine learning models, etc., which can result in the data being transformed/changed or supplemented with new values.

Third, after the enrichment, the user has configured a custom processing function to be used to process the data after the second enrichment stage. In this example, a user function called "PREDICT" is to be called, which as one example could be a function that makes inference/predictions using certain data values of the processed telemetry data, e.g., via use of a hosted machine learning model by a machine learning service of the provider network. However, many other types of custom user-selected processing functions can be used, and the types of the functions supported can be flexibly chosen by the needs of the implementor.

As is shown, "configure" buttons are associated with each phase of the processing function pipeline, which can lead to additional user interfaces to be presented (not shown) to allow the user to further customize how exactly the phase is to work, e.g., by selecting particular data elements to be processed, by providing roles or permissions or credentials that need to be used, by providing other arguments or options that are to be used to control the processing, or the like. Further, many other types of processing functions can be implemented as known to those of skill in the art (or within the range of those of skill in the art), and thus these are simply exemplary.

Finally, the G4UI 300 includes an output destination UI section 312 to identify where the processed telemetry data is to be distributed to. Here, the user has selected that the resultant data (processed by the three configured processing functions above) is to be sent to a storage service within the provider network and also to an external system (e.g., a third-party system, which can be one of several natively-supported third party systems, or a "custom" third-party system). The "configure" buttons allow the user to provide additional configuration information that may be helpful for various destinations, such as particular destinations or placement options for the data, particular credentials to use to connect to these destinations, data formats to use, and the like.

Upon configuring the pipeline to their liking, the user may finally select a "create" UI element (here, a button) that causes the observability pipeline configuration data to be sent to the observability service, which may act in accordance to the description detailed earlier herein with regard to FIG. 1.

Users may also have insight into the activity of the various observability pipelines that are enabled for that user, the user's organization, or the like. FIG. 4 is a diagram illustrating an exemplary GUI for observability pipeline activity monitoring according to some examples.

In FIG. 1, the GUI 400 presents a view 402 presenting a list of the various configured observability pipelines, each being represented as a row with the name of the pipeline together with some statistical/operational data associated with the pipeline. In this example, two different granularities of performance activity are shown—a first column showing a number of items of telemetry data that have been processed by that pipeline over the last hour, and a second column showing the same but over the previous twenty-four hours. Each row also includes a "status" value—here, showing whether the pipeline is "active" or "disabled," and showing whether there is an "error" associated with the pipeline that prevents it from performing correctly. Further, each row has a "more" button allowing the user to view additional operational information about the pipeline, and an "edit" button allowing the user to modify the configuration of the pipeline—e.g., to add or change a processing stage, to add or remove a destination, etc.

Figure 5:
FIG. 5 is a diagram illustrating an exemplary GUI for observability pipeline dynamic pipeline rule configuration and credential configuration according to some examples.

Further, users may be able to provide additional "advanced" configuration data that may be more broadly applicable (e.g., perhaps to more than just one pipeline). FIG. 5 is a diagram illustrating an exemplary GUI for observability pipeline dynamic pipeline rule configuration and credential configuration according to some examples.

In this GUI 500, a first view 502 allows the user to configure dynamic pipeline rules that can be used to change the use of pipelines according to user-configured events, schedules, etc. In this example, the user has configured the system to enable different pipelines based on particular events occurring-here, any security warning being found (e.g., via the analysis of another service of the provider network) involving an "APP2" resource causes an "APP2-PERF-METRICS-TO-SECURITY" pipeline being enabled, whereas any new Linux vulnerability being published (e.g., by a third party publisher, or a particular service of the provider network) will lead to two different observability pipelines being enabled. Beneficially, this can allow various users to keep a minimal set of observability pipeline operational that are needed for typical day-to-day operations and enable additional enhanced observability data to be collected upon particular events of interest. Accordingly, many different types of events can be implemented or configured, where the events may related to occurrences associated with the user's resources within the provider network (e.g., a rise in errors or delay in processing being observed in association with the user's deployed resources), occurrences within the provider network itself (e.g., a security event being detected), occurrences arising outside of the provider network (e.g., a vulnerability being published associated with an application, library, operating system, or the like), etc. The events may also correspond to particular times of day, days of week, etc., that may allow a user to schedule certain pipeline modifications (e.g., enable a pipeline at a particular day and/or time, disable that pipeline at a particular date and/or time or a defined amount of time after another event, such as the enabling of the pipeline).

In this GUI 500, a second view 504 allows the user to provide configuration for the observability service to interact with other systems on the user's behalf. As illustrated, the user may provide credentials (e.g., a username of an account, and a password) that the observability service can use to send data to another service (internal or external) on the user's behalf. However, many other types of data could be provided by the user, such as encryption keys, a secret value, role and/or permission information, storage location information, etc.

Figure 6:
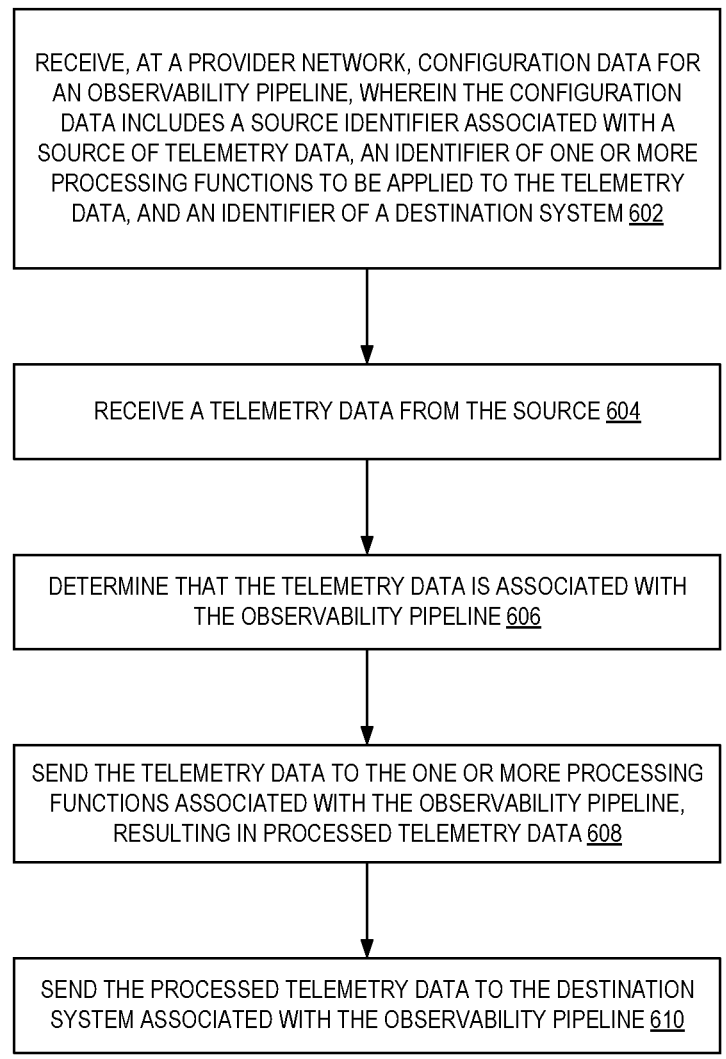
FIG. 6 is a flow diagram illustrating operations of a method for configurable telemetry data processing via observability pipelines according to some examples.

FIG. 6 is a flow diagram illustrating operations 600 of a method for configurable telemetry data processing via observability pipelines according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the observability service 104 of the other figures.

The operations 600 include, at block 602, receiving, at a provider network (e.g., at an observability service), configuration data for an observability pipeline, wherein the configuration data includes a source identifier associated with a source of telemetry data (e.g., originated within the provider network or outside of the provider network), optionally an identifier of one or more processing functions to be applied to the telemetry data, and an identifier of a destination system.

In some examples, the operations 600 further include, after the receipt of the configuration data for the observability pipeline, updating a task definition associated with the source to include a configuration for a telemetry data collection agent; and configuring the telemetry data collection agent to cause the telemetry data that the telemetry data collection agent obtains to be sent to an endpoint associated with an observability service.

In some examples, the configuration data further includes an identifier of a type of telemetry data, and the operations 600 further include: after the receipt of the configuration data for the observability pipeline, validating that the source is configured to provide the type of telemetry data identified in the configuration data.

The operations 600 further include, at block 604, receiving a telemetry data from the source, e.g., at an ingestion server of the observability service.

The operations 600 further include, at block 606, determining that the telemetry data is associated with the observability pipeline. In some examples, the source identifier comprises a unique identifier associated with a container, a compute instance, or a cluster of container instances or compute instances; the telemetry data includes or is associated with the source identifier; and the determining that the telemetry data is associated with the observability pipeline includes performing a lookup in a data structure based on use of the source identifier. In some examples, the source identifier comprises a tag; and the determining that the telemetry data is associated with the observability pipeline includes determining that the source has been previously associated with the tag.

The operations 600 further include, at block 608, sending the telemetry data to the one or more processing functions associated with the observability pipeline, resulting in processed telemetry data.

The operations 600 further include, at block 610, sending the processed telemetry data to the destination system associated with the observability pipeline. In some examples, the destination system comprises an analytics service implemented within the provider network, an object storage service implemented within the provider network, a metrics repository service implemented within the provider network, or a third-party system outside the provider network.

In some examples, the operations 600 further include determining that the telemetry data is associated with a second observability pipeline; sending the telemetry data to a second one or more processing functions associated with the second observability pipeline, resulting in a second processed telemetry data; and sending the second processed telemetry data to the second destination system associated with the second observability pipeline.

In some examples, the source identifier is associated with the source and one or more additional sources, and the operations 600 further include receiving a second telemetry data from one of the one or more additional sources; and determining that the second telemetry data is also associated with the observability pipeline.

In some examples, the configuration data further includes a second identifier associated with a second destination system, and the operations 600 further include sending the processed telemetry data to the second destination system.

In some examples, at least one of the one or more processing functions comprises a user-provided processing function.

In some examples, the operations 600 further include determining that a user-specified trigger condition is satisfied; and updating, enabling, or disabling the observability pipeline.

Figure 7:
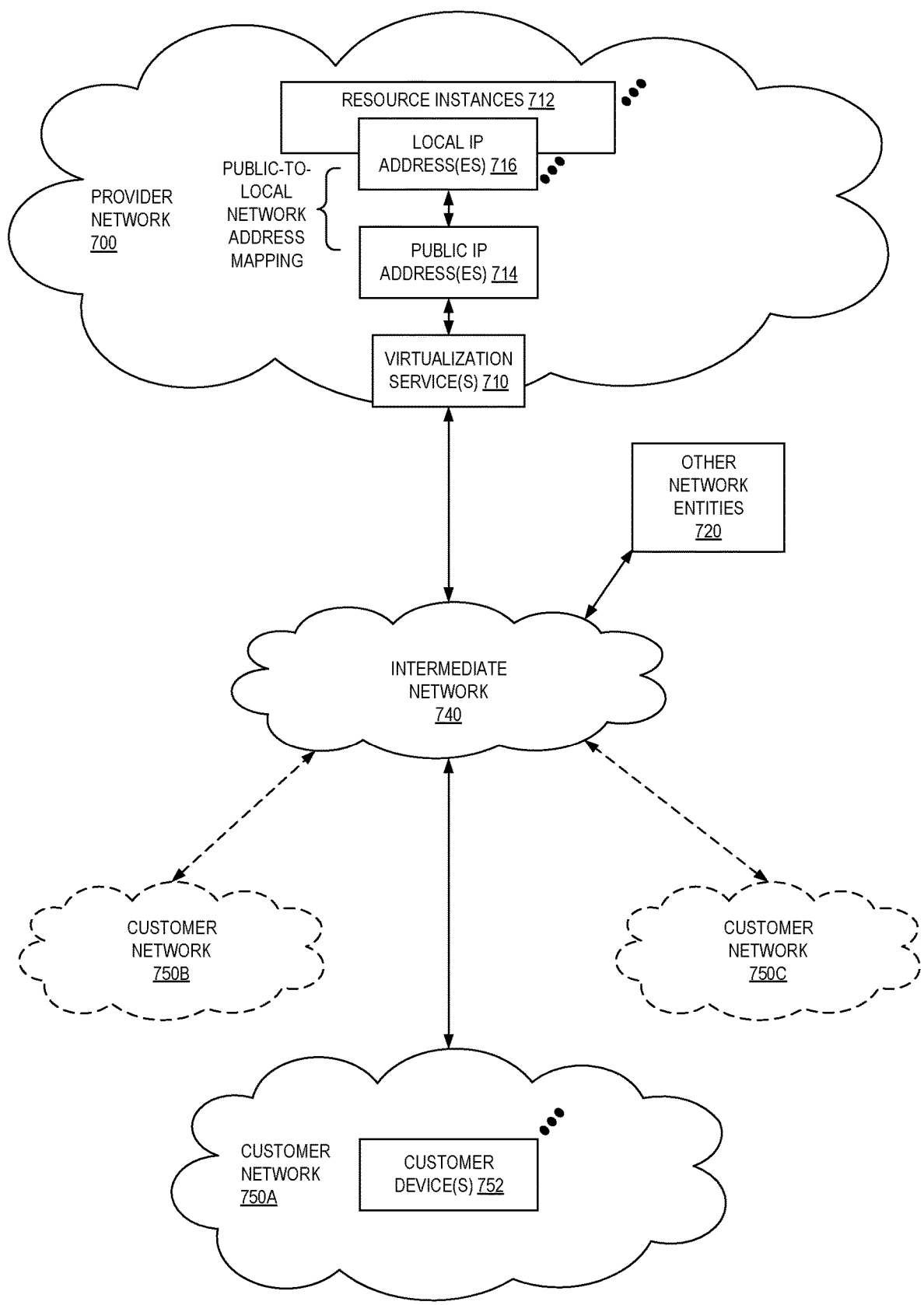
FIG. 7 illustrates an example provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses.

Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
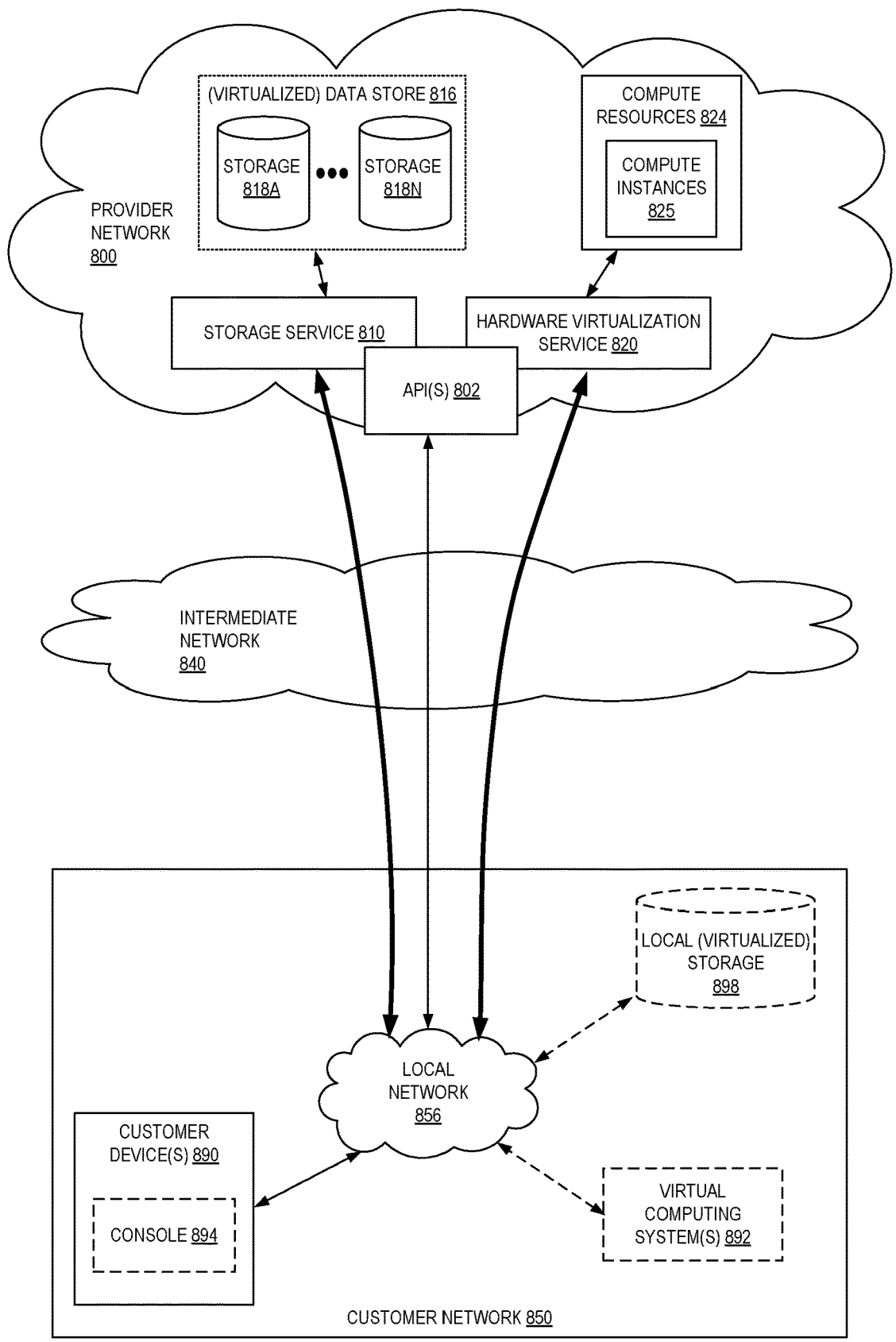
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
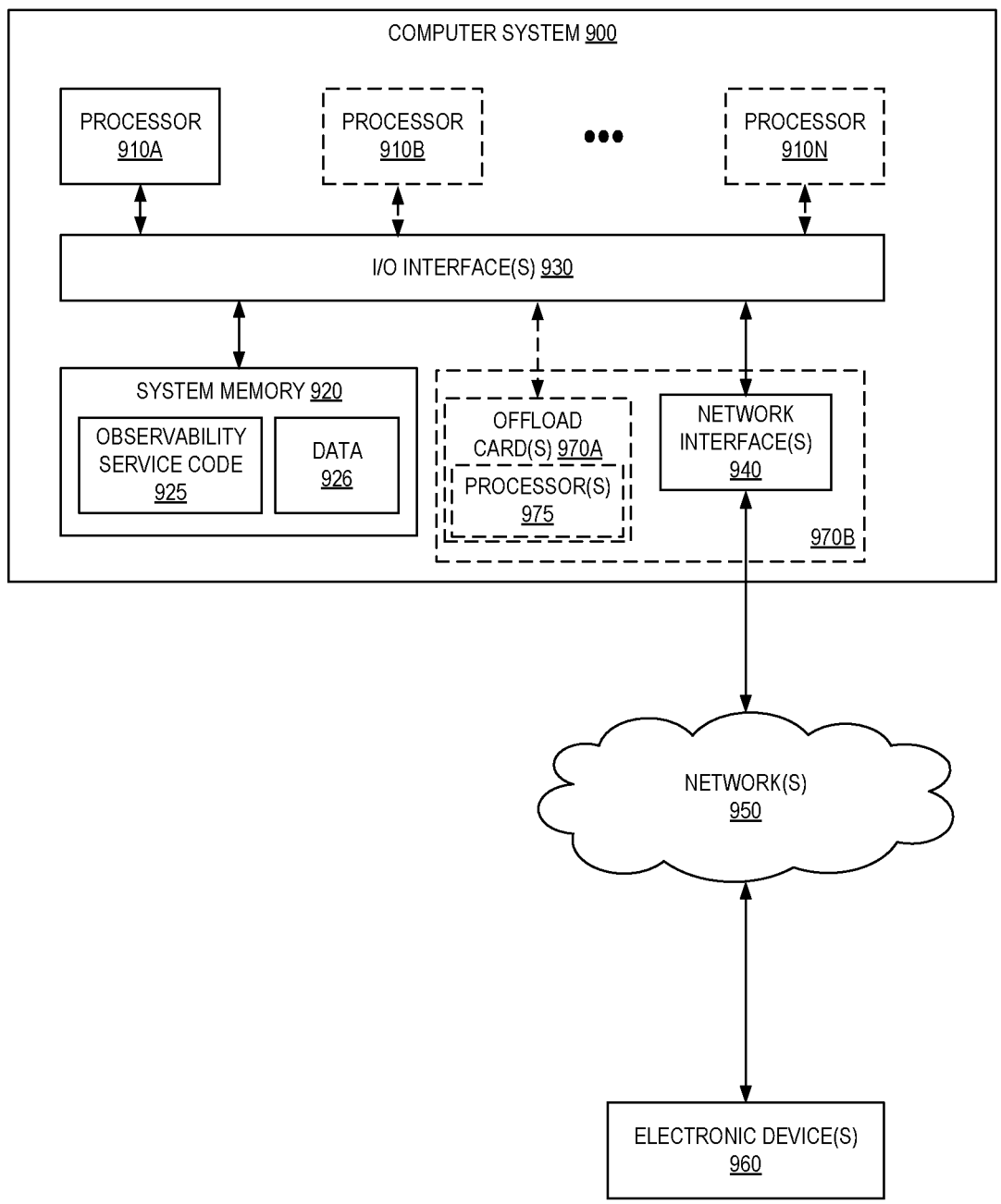
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as observability service code 925 (e.g., executable to implement, in whole or in part, the observability service 104) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
  receiving, at a provider network from a computing device of a user, configuration data for an observability pipeline, wherein the configuration data includes:
    a source identifier associated with a source of telemetry data originated within the provider network, wherein the source comprises a cluster of containers,
    an identifier of one or more processing functions to be applied to the telemetry data, and
    an identifier of a destination system, wherein the destination system is a third-party system located outside of the provider network;
  deploying the one or more processing functions within the provider network;
  receiving a telemetry data from the source;
  determining, based on use of a mapping data structure, that the telemetry data is to be processed at least via the observability pipeline;
  sending the telemetry data to the one or more processing functions associated with the observability pipeline, resulting in processed telemetry data; and
  sending the processed telemetry data to the destination system associated with the observability pipeline.

2. The computer-implemented method of claim 1, further comprising:
  after the receiving of the configuration data for the observability pipeline, updating a task definition associated with the source to include a configuration for a telemetry data collection agent; and
  configuring the telemetry data collection agent to cause the telemetry data that the telemetry data collection agent obtains to be sent to an endpoint associated with an observability service.

3. The computer-implemented method of claim 1, further comprising:
  determining that a user-specified trigger condition is satisfied; and
  updating, enabling, or disabling the observability pipeline.

4. A computer-implemented method comprising:
  receiving, at a provider network, configuration data for an observability pipeline, wherein the configuration data includes a source identifier associated with a source of telemetry data, an identifier of one or more processing functions to be applied to the telemetry data, and an identifier of a destination system;
  receiving a telemetry data from the source;
  determining that the telemetry data is associated with the observability pipeline;
  sending the telemetry data to the one or more processing functions associated with the observability pipeline, resulting in processed telemetry data; and
  sending the processed telemetry data to the destination system associated with the observability pipeline.

5. The computer-implemented method of claim 4, further comprising:
  determining that the telemetry data is associated with a second observability pipeline;
  sending the telemetry data to a second one or more processing functions associated with the second observability pipeline, resulting in a second processed telemetry data; and
  sending the second processed telemetry data to a second destination system associated with the second observability pipeline.

6. The computer-implemented method of claim 4, wherein:
  the source identifier comprises a unique identifier associated with a container, a compute instance, or a cluster of container instances or compute instances;
  the telemetry data includes or is associated with the source identifier; and
  the determining that the telemetry data is associated with the observability pipeline includes performing a lookup in a data structure based on use of the source identifier.

7. The computer-implemented method of claim 4, wherein:
  the source identifier comprises a tag; and
  the determining that the telemetry data is associated with the observability pipeline includes determining that the source has been previously associated with the tag.

8. The computer-implemented method of claim 4, wherein:
  the destination system comprises an analytics service implemented within the provider network, an object storage service implemented within the provider network, a metrics repository service implemented within the provider network, or a third-party system outside the provider network.

9. The computer-implemented method of claim 4, further comprising:
  after the receiving of the configuration data for the observability pipeline, updating a task definition associated with the source to include a configuration for a telemetry data collection agent; and
  configuring the telemetry data collection agent to cause the telemetry data that the telemetry data collection agent obtains to be sent to an endpoint associated with an observability service.

10. The computer-implemented method of claim 4, wherein the configuration data further includes an identifier of a type of telemetry data, the method further comprising:
  after the receiving of the configuration data for the observability pipeline, validating that the source is configured to provide the type of telemetry data identified in the configuration data.

11. The computer-implemented method of claim 4, wherein the source identifier is associated with the source and one or more additional sources, and wherein the method further comprises:
  receiving a second telemetry data from one of the one or more additional sources; and
  determining that the second telemetry data is also associated with the observability pipeline.

12. The computer-implemented method of claim 4, wherein the configuration data further includes a second identifier associated with a second destination system, and wherein the method further comprises sending the processed telemetry data to the second destination system.

13. The computer-implemented method of claim 4, wherein at least one of the one or more processing functions comprises a user-provided processing function.

14. The computer-implemented method of claim 4, further comprising:
  determining that a user-specified trigger condition is satisfied; and
  updating, enabling, or disabling the observability pipeline.

15. A system comprising:
a first one or more electronic devices with at least a processor and a memory to implement a managed compute service in a multi-tenant provider network, the managed compute service to execute application code of a user and one or more collector agents to obtain telemetry data and send the telemetry data to an observability service; and
a second one or more electronic devices with at least a processor and a memory to implement the observability service in the multi-tenant provider network, the memory including instructions that upon execution cause the observability service to:
receive configuration data for an observability pipeline, wherein the configuration data includes a source identifier associated with a source of telemetry data, an identifier of one or more processing functions to be applied to the telemetry data, and an identifier of a destination system;
receive a telemetry data from the source;
determine that the telemetry data is associated with the observability pipeline;
send the telemetry data to the one or more processing functions associated with the observability pipeline, resulting in processed telemetry data; and
send the processed telemetry data to the destination system associated with the observability pipeline.

16. The system of claim 15, wherein the observability service is further to:
determine that the telemetry data is associated with a second observability pipeline;
send the telemetry data to a second one or more processing functions associated with the second observability pipeline, resulting in a second processed telemetry data; and
send the second processed telemetry data to a second destination system associated with the second observability pipeline.

17. The system of claim 15, wherein:
the source identifier comprises a unique identifier associated with a container, a compute instance, or a cluster of container instances or compute instances;
the telemetry data includes or is associated with the source identifier; and
to determine that the telemetry data is associated with the observability pipeline the observability service is at least to perform a lookup in a data structure based on use of the source identifier.

18. The system of claim 15, wherein:
the source identifier comprises a tag; and
to determine that the telemetry data is associated with the observability pipeline the observability service is at least to determine that the source has been previously associated with the tag.

19. The system of claim 15, wherein the destination system comprises an analytics service implemented within the provider network, an object storage service implemented within the provider network, a metrics repository service implemented within the provider network, or a third-party system outside the provider network.

20. The system of claim 15, wherein the observability service further includes instructions that upon execution cause the observability service to:
after the receipt of the configuration data for the observability pipeline, update a task definition associated with the source to include a configuration for a telemetry data collection agent; and
configure the telemetry data collection agent to cause the telemetry data that the telemetry data collection agent obtains to be sent to an endpoint associated with the observability service.

* * * * *